(12) United States Patent
Nagara et al.

(10) Patent No.: US 9,233,609 B2
(45) Date of Patent: *Jan. 12, 2016

(54) TRANSMISSIVE DISPLAY OVER GAUGE

(75) Inventors: Wes A. Nagara, Commerce Twp., MI (US); Theodore C. Wingrove, Canton, MI (US); Dale O. Cramer, Royal Oak, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/345,229

(22) Filed: Jan. 6, 2012

(65) Prior Publication Data

US 2013/0176118 A1    Jul. 11, 2013

(51) Int. Cl.
| | | |
|---|---|---|
| *B60Q 1/00* | (2006.01) | |
| *B60K 37/02* | (2006.01) | |
| *G09G 5/00* | (2006.01) | |
| *G01D 13/22* | (2006.01) | |
| *G01D 13/00* | (2006.01) | |

(52) U.S. Cl.
CPC ......... *B60K 37/02* (2013.01); *B60K 2350/1064* (2013.01); *B60K 2350/1072* (2013.01); *B60K 2350/206* (2013.01); *B60K 2350/403* (2013.01)

(58) Field of Classification Search
CPC ................................ B60K 35/00; B60K 37/02
USPC .......... 340/425.5, 461; 116/201, 62.4; 701/36
See application file for complete search history.

(56) References Cited

U.S. PATENT DOCUMENTS

| | | | | |
|---|---|---|---|---|
| 6,181,301 | B1 * | 1/2001 | Inoguchi | B60K 37/02 345/4 |
| 6,382,127 | B2 * | 5/2002 | Wehner | B60K 37/02 116/284 |
| 7,159,534 | B2 * | 1/2007 | Tanaka | B60K 37/02 116/288 |
| 2001/0024361 | A1 * | 9/2001 | Suzuki | B60Q 3/044 362/23.02 |
| 2006/0290486 | A1 * | 12/2006 | Sumiya | B60K 37/02 340/461 |
| 2007/0063921 | A1 * | 3/2007 | Harada | B60K 37/02 345/1.1 |
| 2008/0141927 | A1 * | 6/2008 | Takeshige | B60K 37/02 116/62.4 |
| 2008/0219018 | A1 * | 9/2008 | Eich | B60K 37/02 362/489 |
| 2008/0266075 | A1 * | 10/2008 | Okumura | G09G 3/20 340/461 |

FOREIGN PATENT DOCUMENTS

| | | |
|---|---|---|
| DE | 19757545 A1 | 6/1998 |
| DE | 102006026355 A1 | 12/2006 |
| EP | 1724556 A1 | 11/2006 |
| JP | H09-31395 | 12/1997 |
| JP | 2005-181054 | 7/2005 |
| JP | 2008-275378 | 11/2008 |

(Continued)

OTHER PUBLICATIONS

Translation of Office Action from corresponding Japanese patent application 2012-288754 dated Dec. 24, 2013.

(Continued)

*Primary Examiner* — Jack K Wang
(74) *Attorney, Agent, or Firm* — Klintworth & Rozenblat IP LLC (57) ABSTRACT

A vehicle instrument panel is provided. The vehicle instrument panel includes, but is not limited to, an analogue indicator overlying a first substrate and a display device overlying the analogue indicator. The display device has transparent portions for allowing light to pass through and non-transparent portions for displaying information.

21 Claims, 4 Drawing Sheets

(56) References Cited

FOREIGN PATENT DOCUMENTS

| | | |
|---|---|---|
| JP | 2009-053177 | 3/2009 |
| JP | 2010-276496 | 12/2010 |
| JP | 2011-058998 | 3/2011 |

OTHER PUBLICATIONS

Office Action dated Oct. 21, 2014 from corresponding German patent application 102012112260.1, 10 pages.

* cited by examiner

TRANSMISSIVE DISPLAY OVER GAUGE

BACKGROUND OF THE INVENTION

Originally, vehicle instrument panels used analog gauges to display the operational status and performance of a vehicle using mechanical or electro-mechanical means. Vehicles include any device that is designed or used to transport people or cargo, such as bicycles, cars, motorcycles, trains, ships, boats, and aircraft. However, only factors that could be directly measured could be displayed to the driver or pilot using analog gauges. Common analogue gauges include, but are not limited to: speedometers which measure vehicle velocity; tachometers which measure engine revolutions per minute (RPM); odometers which measure distance traveled by a vehicle; fuel level gauges which measure the amount of fuel remaining in a vehicle; oil pressure gauges which measure the oil pressure within a vehicle's engine; and engine temperature gauges which measure temperature of an engine. Each analog gauge is connected with a sensor providing a signal in direct proportion to the value being measured by the gauge.

Often, some analogue gauges are aligned and grouped together to form an instrument cluster or instrument panel. The instrument panel may contain analogue gauges such as a speedometer, tachometer, odometer and a fuel gauge, along with vehicle indicators which indicate a condition of the vehicle, such as gearshift position, seat belt warning light, parking-brake-engagement warning light, and an engine-malfunction light. There may also be vehicle indicators for indicating low fuel, low oil pressure, low tire pressure and faults in the airbag (SRS) system. The instrument panel may also contain printed marks, such as a scale and numerals aligned with the scale.

As technology has advanced, analog gauges and sensors have been replaced by digital or simulated gauges and sensors. Digital gauges replace the mechanical or electro-mechanical means of analogue gauges with simple alphanumeric text or animated bars displayed on a display device. Digital gauges do not have the look and feel of analogue gauges. Simulated gauges attempt to mimic the look and feel of an analogue gauges on a display device. An instrument panel may include digital or simulated gauges which, rather than being connected directly to the sensors monitoring the performance of the vehicle, are connected with a digital controller that is connected with digital sensors. The digital controller then monitors the output of the digital sensors, processes the information, and displays the information on a display device positioned on the instrument panel in a manner useful to the driver or occupant of the vehicle.

Various types of vehicle information may be used and displayed on a display device, including digital and simulated gauges. A display device is an output device for the presentation of information in visual form, and includes things such as segment displays, 2-dimensional displays, and 3-dimensional displays. A display device may use a variety of technology to display the information, such as cathode ray tubes, a light-emitting diode display (LED), an electroluminescent display (ELD), an electronic paper (E Ink) display, a plasma display panel (PDP), a liquid crystal display (LCD), a high-performance addressing display (HPA), a thin-film transistor display (TFT), a light emitting diode (LED) display, an organic light-emitting diode (OLED) display, a surface-conduction electron-emitter display (SED), a Laser TV, a carbon nanotubes display, a quantum dot display, and an interferometric modulator display (IMOD). Numeric digital displays have been used where, for example, the speed of the vehicle was displayed in an alpha-numeric lighted display. Other vehicle information may be displayed using flat-panel displays, such as LCD displays, LED displays, OLED displays, or PDP displays, for the display of additional information, such as mileage or oil pressure.

Some vehicle information is more readily interpreted using a display device. For example, rather than lighting a generic "check engine" light when a problem is detected by the digital controller, a display device may allow the digital controller to display more detailed vehicle information, such as "change oil" or "low tire pressure." In addition, a single display device can have multiple functions, thereby saving space. Finally, if a large color display device used, it is possible for the digital controller to include a navigation system and display navigation and/or map information on the display device. Such a configuration may display navigational maps which, when incorporated with a global positioning system (GPS), can display the vehicle's location on the display device.

Despite the flexibility of display devices for displaying vehicle information and simulated gauges, some consumers have preferred the behavior and appearance of traditional analog gauges. Analogue gauges may be used in conjunction with a digital controller by attaching an indicator, such as a pointer, to a small electric motor electrically coupled to the digital controller. The digital controller may command the electric motor to move the indicator between numbers on a scale representing, for example, miles per hour, printed on an instrument panel.

One drawback of large display devices is that they occupy a significant amount of area. Therefore, if a large display device, for example, is included in an instrument panel, some analog indicators may have to be omitted since there may not be enough space on the instrument panel to include both. As mentioned earlier, many consumers of vehicles prefer analog gauges to monitor certain parameters. Some of these analogue gauges, such as a speedometer, may be quite large and take up a significant amount of area on the instrument panel. This limits the amount of space available for a large display device, such as a large flat-panel display.

In order to get around this problem, some instrument panels include a large display device that displays a plurality of simulated gauges. Each simulated gauge comprises a series of animated digital representations which are used to simulate an analogue gauge on a display device. In order to realistically display simulated analogue gauges, high end graphics need to be used which typically require very powerful processors in order to realistically display and animate the digital representations used to simulate the analogue gauges. These powerful processors typically increase system cost, generate more heat, and consume more energy. Additionally, it is often difficult to realistically display the simulated analogue gauges, since the simulated gauges may not always animate smoothly, such as when an indicator needle or pointer is moving rapidly on a simulated speedometer. As a result, the simulated gauges may not appear realistic to a user.

As a result, it would be desirable to be able to display analogue gauges in a realistic manner on an instrument panel in conjunction with a large display device, without having to use powerful processors and without limiting the size of the display device.

SUMMARY

The present invention is defined by the following claims, and nothing in this section should be taken as a limitation on those claims.

In one aspect, a vehicle instrument panel is provided. The vehicle instrument panel includes, but is not limited to, an analogue indicator overlying a first substrate, a scale aligned with the analogue indicator, and a transmissive display overlying the analogue indicator. The transmissive display has a transparent portion overlying a portion of the analogue indicator and a non-transparent portion for displaying information. The analogue indicator and scale are visible to an occupant.

In one aspect, a vehicle instrument panel is provided. The vehicle instrument panel includes, but is not limited to, an analogue indicator overlying a first substrate and a display device overlying the analogue indicator. The display device has transparent portions for allowing light to pass through and non-transparent portions for displaying information.

In one aspect, a method for displaying information on a vehicle instrument panel is provided. The method includes, but is not limited to, displaying analogue information via an analogue indicator overlying a first substrate and displaying information via a display device overlying the analogue indicator. The display device has a transparent portion through which the analogue indicator is visible and a non-transparent portion for displaying information.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Methods and devices consistent with the present invention overcome the disadvantages of conventional instrument panels by using an instrument panel which positions a display device overlying an analogue indicator. The display device has transparent portions for allowing light to pass through overlying a portion of the analogue indicator and making the analogue indicator visible through the display device. The display device also has non-transparent portions for displaying vehicle information. By using a display device with transparent portions, the instrument panel of the present invention is able to display an analogue gauge in a realistic manner on an instrument panel in conjunction with a large display device, without having to use powerful processors and without limiting the size of the display device.

Figure 1:
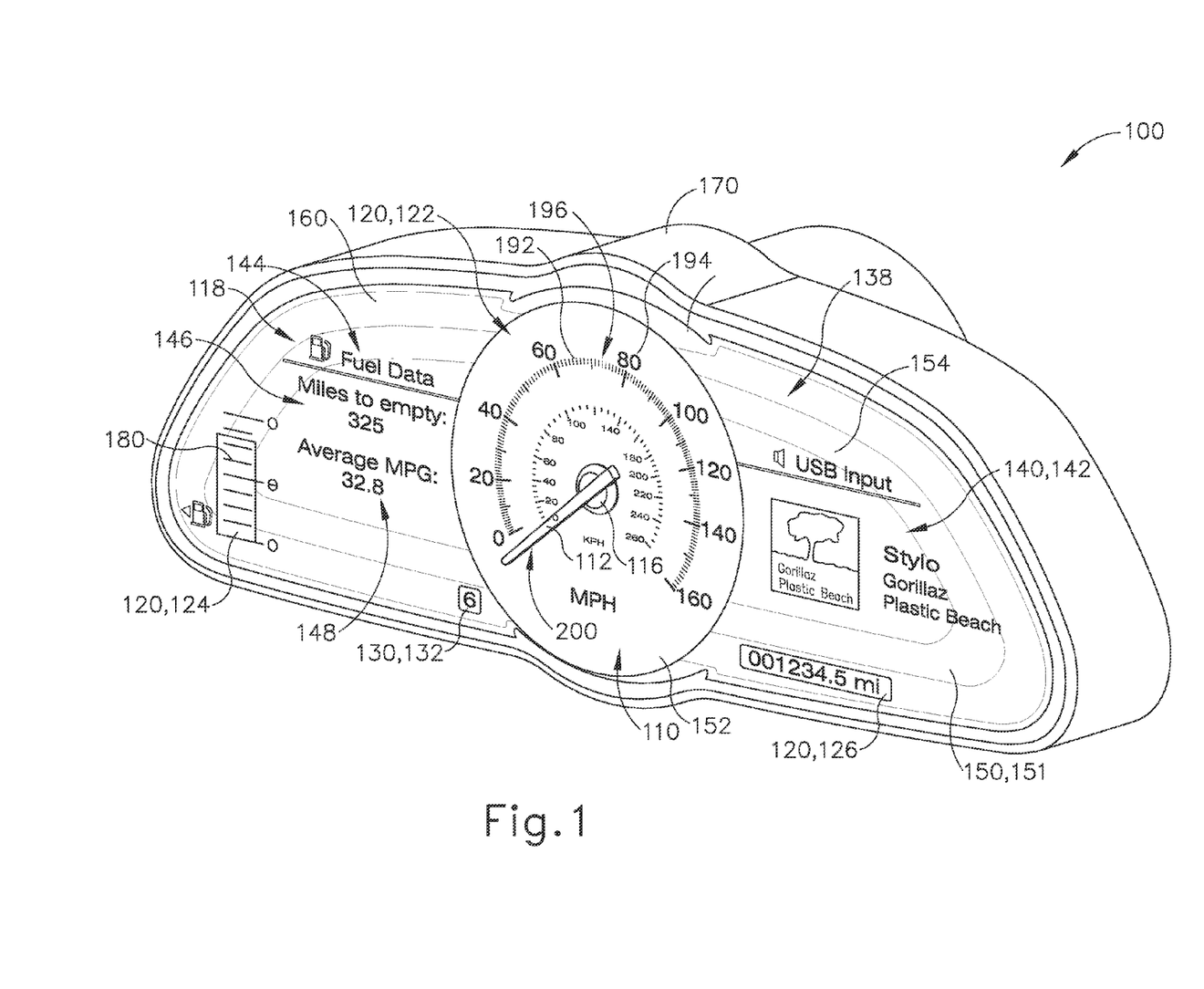
FIG. 1 depicts a perspective view of an instrument panel in accordance with one preferred embodiment.
Figure 2:
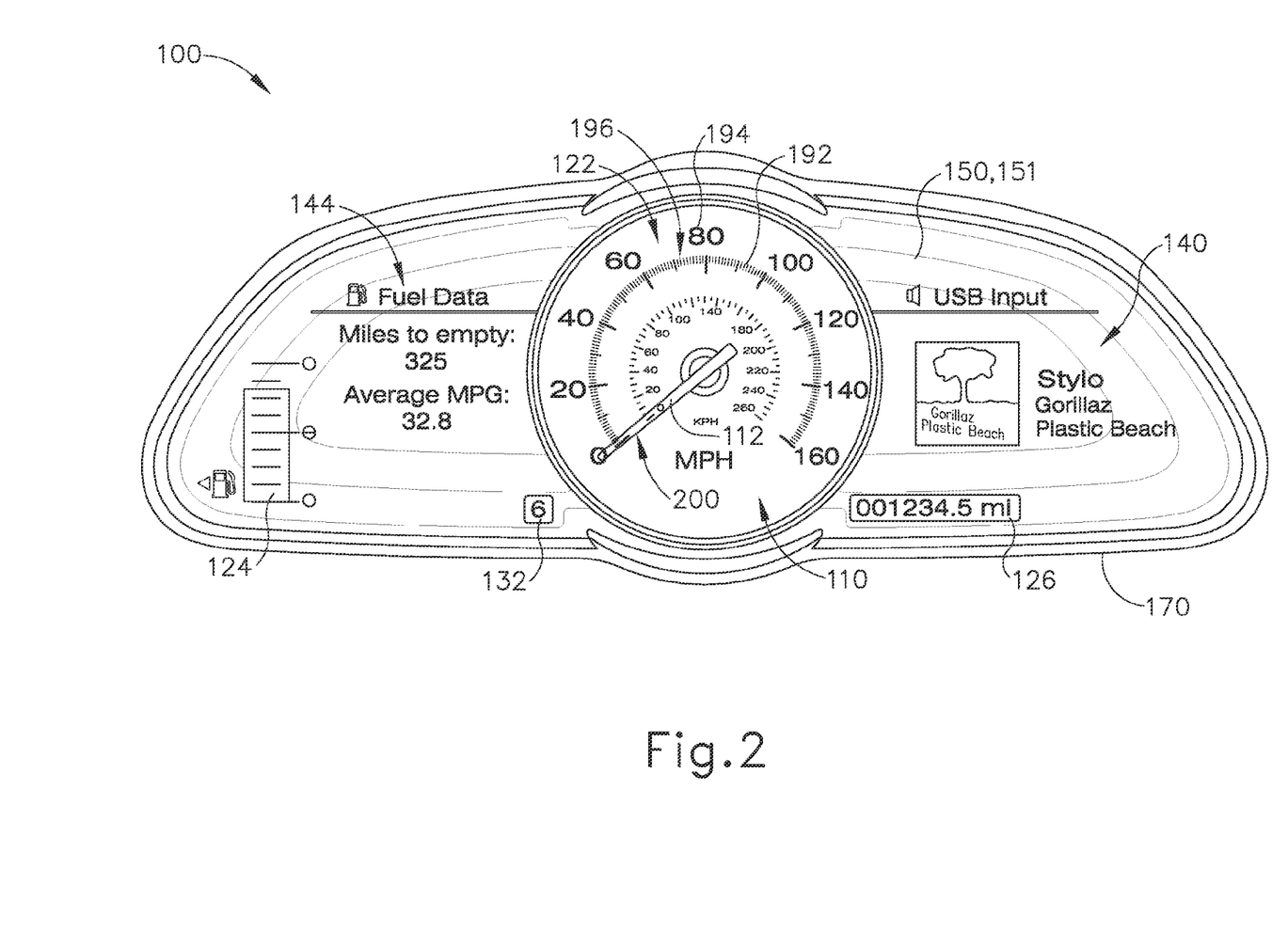
FIG. 2 depicts a top view of the instrument panel displayed in FIG. 1, in accordance with one preferred embodiment.

With reference to FIGS. 1 and 2, an instrument panel 100 consistent with the present invention is provided. Instrument panel 100 presents information 138 to an occupant of a vehicle, such as a driver of the vehicle. As used herein, a vehicle include any device that is designed or used to transport people or cargo, such as bicycles, cars, motorcycles, trains, ships, boats, and aircraft.

Information 138 is any type of information which an occupant of a vehicle may wish to see, and can include both vehicle information 118 and non-vehicle information 140. Vehicle information 118 is any information which relates to the operation of the vehicle including vehicle velocity, engine RPM, distance traveled by a vehicle, an amount of fuel remaining in a vehicle, oil pressure within a vehicle's engine, temperature of an engine, vehicle range, vehicle mileage, vehicle fuel economy. Vehicle information 118 may be displayed using vehicle gauges 120, which may be analogue gauges 110 or digital gauges 180. Preferably, vehicle information 118 is not displayed on simulated gauges which comprise a series of animated digital representations which are used to simulate an analogue gauge on a display device. Vehicle gauges 120 include speedometers 122 which measure vehicle velocity; tachometers which measure engine RPM; odometers 126 which measure distance traveled by a vehicle; fuel level gauges 124 which measure the amount of fuel remaining in a vehicle; oil pressure gauges which measure the oil pressure within a vehicle's engine; and engine temperature gauges which measure temperature of an engine. Each vehicle gauge 120 is connected with a sensor (not shown) providing a signal in direct proportion to the value being measured by the vehicle gauge 120.

Vehicle information 118 may be also be displayed using vehicle indicators 130 which display information alerting the occupant about a condition of a vehicle, such as when a vehicle's oil needs to be replaced, when a vehicle's gas is running low, when a vehicle's engine is not performing correctly, what gear the transmission is in or gearshift position 132, when any other vehicle part or system is not performing correctly, a vehicle's range 146, a low vehicle oil pressure, a low vehicle tire pressure, faults in any vehicle system such as a vehicle airbag (SRS) system, and a vehicle's miles per gallon (MPG) or average MPG 148, a seat belt warning, a parking-brake-engagement warning, and an engine-malfunction or other system malfunction warning.

Non-vehicle information 140 includes any other type of information which is not directly related to a condition of a vehicle or the operation of the vehicle, but which may or may not be useful in operation of the vehicle. Non-vehicle information 140 includes navigation and/or map information such as navigational maps which, when incorporated with a global positioning system (GPS), can display the vehicle's location on a display device. Non-vehicle information 140 may also include: music information 142 such as album cover art, album title, song, title, duration, and artist's name of a song which is being played in the vehicle; news information regarding current events; location information pertaining to the vehicle's location; communication information such as a phone number and contact name for a phone number which is being dialed by and in use by a telephone in the vehicle; interne information which includes any information which may be accessed via a web browser; multimedia, movie, and television information which may include a video stream and/or information regarding the name or title of the video stream being played in the vehicle; and any other information which can be presented on a display device.

The vehicle instrument panel 100 includes an analogue indicator 112 overlying a first substrate 106 and a display device 150 overlying the analogue indicator 112. The analogue indicator 112 is any moving mechanical device which can be used to indicate a condition or operational state of a vehicle, such as a needle, a pointer, a gauge, or a select/reset. Preferably, the analogue indicator 112, in conjunction with a graphics 196 aligned with the analogue indicator 112, is connected with an electromechanical device 114 to form an analogue gauge 110. Graphics 196 are aligned with the analogue indicator 112 and preferably include a scale 192 and numerals 194 aligned with the scale 192 in order to communicate some sort of vehicle information 118 to an occupant, such as the present velocity of the vehicle, or the vehicle's engine RPM. The graphics 196 may be animated and may also convey messages or other information 138 to an occupant. The electromechanical device 114 is any device which can be used to move the analogue indicator 112, preferably along the scale 192, such as an electric motor coupled with the analogue indicator via a member, such as a mechanical faster 116, a mechanical gear, a mechanical track or other mechanical means, a magnetic member, or other such means. In one embodiment, the analog indicator 112 is rotatably coupled to the electromechanical device 114 for a movement by the electromechanical device 114. The analogue indicator 112 and graphics 196 are visible to an occupant through the display device 150.

The analogue gauge 110 may represents any common analogue gauge including: a speedometer 122 which measures vehicle velocity; a tachometer which measure engine revolutions per minute (RPM); an odometer 126 which measure distance traveled by a vehicle; a fuel gauge 124 which measure the amount of fuel remaining in a vehicle; an oil pressure gauge which measure the oil pressure within a vehicle's engine; and an engine temperature gauge which measure temperature of an engine.

Figure 3:
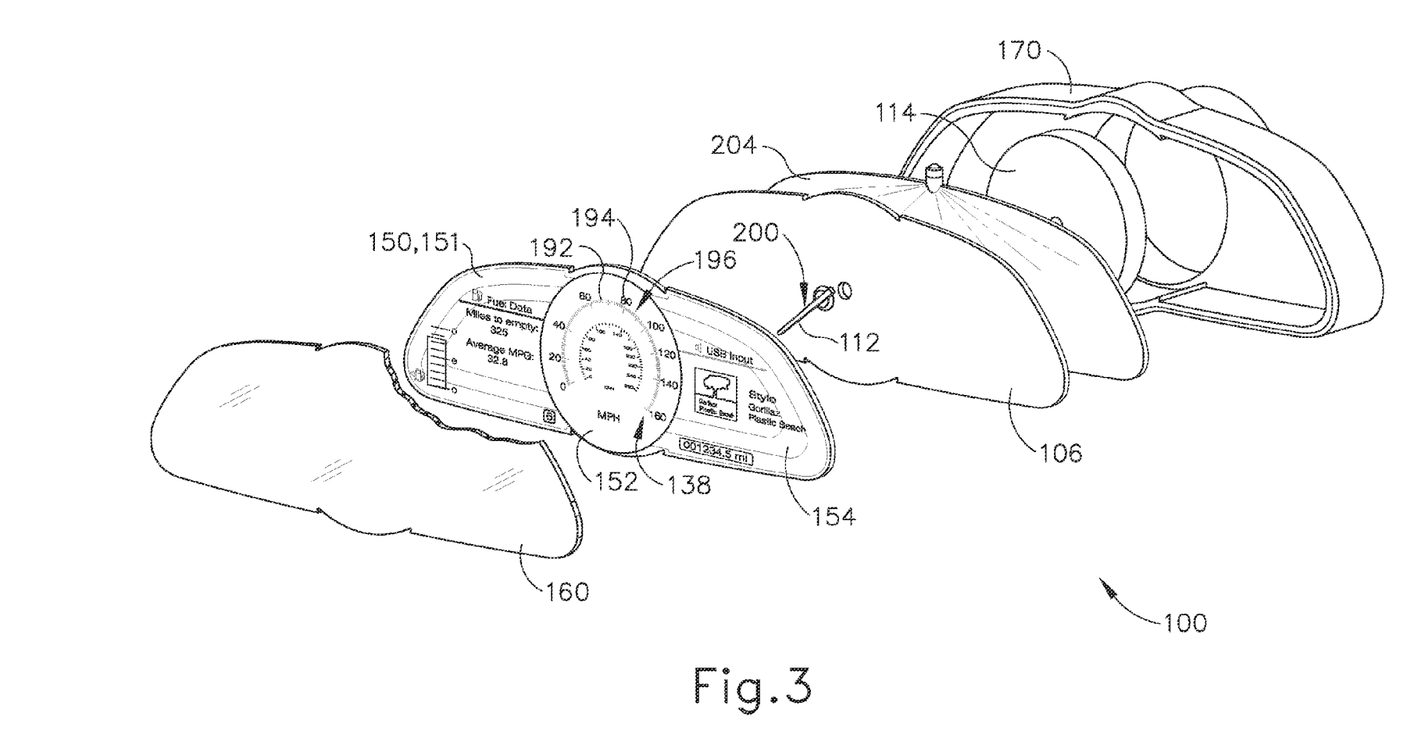
FIG. 3 depicts an exploded perspective view of the instrument panel displayed in FIG. 1, in accordance with one preferred embodiment.
Figure 4:
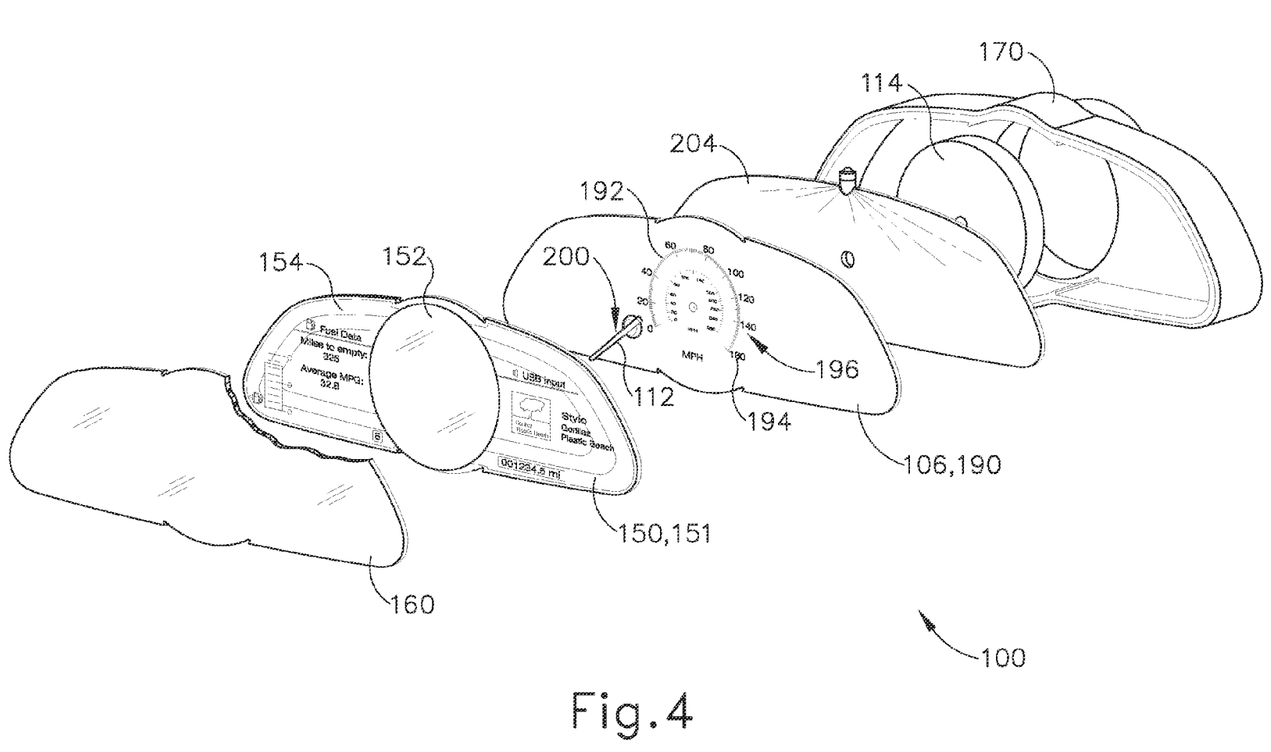
FIG. 4 depicts an exploded perspective view of an instrument panel, in accordance with one preferred embodiment.

Analogue indicator 112 overlies first substrate 106. With reference to FIGS. 3 and 4, preferably, the first substrate 106 is located in between the analogue indicator 112 and the electromechanical device 114. First substrate 106 may be any one of a number of items which can provide a backdrop upon which the analogue indicator 112 can move over and be displayed. In one embodiment, first substrate 106 is a transparent substrate or an illuminated substrate which transmits light upon which the analogue indicator 112 overlies.

In one embodiment, the substrate 106 can be a secondary display device. This can be an LCD or other type of display. The first display device 150 and the secondary display device represented by substrate 106 can be coordinated to function with the analog components, such as the analogue indicator 112 or needle. In one embodiment, first substrate 106 is an underlying display device 190 located underneath the analogue indicator 112. Preferably, the scale 192, and preferably the numerals 194, is displayed on the underlying display device 190 and aligned with the analogue indicator 112. In one embodiment, the first substrate 106 is any substrate which can provide a backdrop upon which the analogue indicator 112 can move over and be displayed, such as a plastic or metal substrate of different color than the analogue indicator 112. In one embodiment, the graphics 196, such as the scale 192 and preferably the numerals 194, are displayed on the first substrate 106 either by being printed on the first substrate 106 located underneath the analogue indicator 112, by being electronically illuminated on the first substrate 106, or by being displayed using a display device on the first substrate 106.

Display device 150 overlies the analogue indicator 112. Display device 150 is an output device for the presentation of information 138 in visual form. Information 138 is provided to the display device 150 via an analogue or digital signal and then converted by the display device 150 to visual form and displayed for an occupant to view. Display device 150 may use a variety of technology to display the information 138, such as a liquid crystal display (LCD), a high-performance addressing display (HPA), a thin-film transistor display (TFT), a light emitting diode (LED) display, an organic light-emitting diode (OLED) display. Preferably, display device 150 is a transmissive or translucent display which allows for light to be transmitted through portions of the display device, such as a translucent LCD display manufactured by Samsung Electronics of South Korea, or a Head(s)-up Display (HUD) wherein the display is projected onto a substrate such as a transparent plastic substrate like Plexiglas™ wherein the display device 150 allows light to pass through the display device 150 in areas of the display device 150 which are not displaying information 138. As a result, display device 150 is able to have both transparent portions 152, through which light is able to pass mostly through, preferably through which more than 50% of the light passes through, and preferably more than 70% of the light passes through, and non-transparent portions 154, which display information 138 and are able to block preferably 10%, and more preferably 50%, or more of the light passing through the non-transparent portions 154.

In one embodiment, display device 150 has a transparent portion 152 overlying a portion of the analogue indicator 112 and a non-transparent portion 152 for displaying information 138. By overlying the transparent portion 152 over a portion of the analogue indicator 112, a portion of the analogue indicator 112 is visible to an occupant through the display device 150. By allowing for a portion of the analogue indicator 112 to be visible to an occupant through the display device 150, both the analogue indicator 112 along with the display device 150 may be visible to an occupant without having to use powerful processors and without limiting the size of the display device 150.

With reference to FIG. 3, in one embodiment, information 138 overlying the analogue indicator 112 is displayed on the display device 150. For example, the graphics 196, such as the scale 192 and preferably the numerals 194, may be displayed on the display device 150 overlying the analogue indicator 112 and used in combination with the analogue indicator 112 to form the analogue gauge 110.

With reference to FIGS. 3 and 4, in one embodiment, the display device 150 is spaced apart from the analogue indicator 112 in order to convey depth to an occupant. Preferably, the display device 150 is spaced a distance of 5 mm to 25 mm from the analogue indicator 112 in order to convey depth to an occupant.

With reference to FIGS. 3 and 4, in one embodiment, the vehicle instrument panel 100 includes a protective cover 160 connected with the housing and overlying the display device 150 in order to protect the display device 150. Preferably, the protective cover 160 is translucent or transparent and is made from a translucent or transparent material, such as plastic, Plexiglas™, Gorilla Glass™ or glass.

With reference to FIGS. 3 and 4, in one embodiment, the vehicle instrument panel 100 includes a lighting member 204 to illuminate the display device 150 and/or the first substrate 106. Lighting member 204 directs light through the display device 150 and/or the first substrate 106 in order to illuminate the display device 150 and/or the first substrate 106 and provide backlighting. Preferably, the lighting member 204 is a backlight, such as an LED backlight or uses a light source to generate light used to illuminate a light valve which then directs light at the display device 150 and/or the first substrate 106. The light source may be any device which can generate light, such as an incandescent light bulb, a light-emitting diode (LED), an electroluminescent panel (ELP), a cold cathode fluorescent lamp (CCFL), and a hot cathode fluorescent lamp (HCFL). The lighting member 204 may be placed anywhere within the organizational structure of the instrumental panel 100.

In operation, the vehicle instrument panel 100 has the analogue indicator 112 mounted in the housing 170 overlying the electromechanical device 114 and preferably overlying the first substrate 106 and the electromechanical device 114. The display device 150 is also mounted in or on the housing 170 overlying the analogue indicator 112. The analogue indicator 112 is visible through the display device 150. Preferably, the first substrate 106 overlies lighting member 204 which generates lights that illuminates through the first substrate 106, preferably onto the analogue indicator 112, and through the display device 150. The analogue indicator 112 displays analogue information 200, which is information that is conveyed not using a display device 150, and uses things such as electromechanical means to conveys information to an occupant. For example, the position or movement of the analogue indicator 112 conveys analogue information 200 to an occupant. The display device 150 displays information 138 to an occupant. The display device 150 has transparent portions 152 for allowing light to pass through and through which the analogue indicator 112 is visible and non-transparent portions 154 for displaying information 138 to an occupant. In this manner, by using a display device 150 which has transparent portions 152 overlying an analogue indicator 112 and a non-transparent portions 154 displaying information, the vehicle instrument panel 100 allows for both an analogue indicator 112 along with a large display device 150 displaying information 138 to be visible to an occupant without having to use powerful processors and without limiting the size of the display device 150.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A vehicle instrument panel comprising:
an analogue indicator overlying a first substrate;
a scale aligned with the analogue indicator; and
a transmissive display overlying the analogue indicator, wherein the transmissive display member comprises a transparent portion which continuously remains transparent while vehicle is in operation and a non-transparent portion which continuously remains non-transparent while the vehicle is in operation, the transparent portion aligned directly over the analogue indicator, the non-transparent portion not aligned directly over the analogue indicator, the non-transparent portion configured to digitally display information which is not aligned directly over the analogue indicator, wherein the analogue indicator and the scale are visible to an occupant of a vehicle.

2. The vehicle instrument panel of claim 1, wherein the scale has numerals aligned with the scale.

3. The vehicle instrument panel of claim 1, wherein the transmissive display member, overlying the analogue indicator, comprises the scale.

4. The vehicle instrument panel of claim 1, wherein the first substrate is an underlying display member located underneath the analogue indicator, and wherein the scale is displayed on the underlying display member.

5. The vehicle instrument panel of claim 1, wherein the scale is printed on the first substrate located underneath the analogue indicator.

6. The vehicle instrument panel of claim 1, wherein the analog indicator is rotatably coupled to an electromechanical device for a movement by the electromechanical device.

7. The vehicle instrument panel of claim 1, wherein the transmissive display is spaced apart from the analogue indicator in order to convey depth to an occupant.

8. A vehicle instrument panel comprising:
an analogue indicator comprising a mechanical device, overlying a first substrate; and
a display device overlying the analogue indicator, wherein the display member comprises a transparent portion which continuously remains transparent while a vehicle is in operation and a non-transparent portion which continuously remains non-transparent while the vehicle is in operation, the transparent portion aligned directly over the analogue indicator, the non-transparent portion not aligned directly over the analogue indicator, the non-transparent portion configured to digitally display information which is not aligned directly over the analogue indicator.

9. The vehicle instrument panel of claim 8, wherein a portion of the analogue indicator is visible through the transparent portion of the display member.

10. The vehicle instrument panel of claim 8 further comprising a scale aligned with the analogue indicator.

11. The vehicle instrument panel of claim 8, wherein the first substrate is an underlying display device located underneath the analogue indicator, and wherein a scale is displayed on the underlying display member.

12. The vehicle instrument panel of claim 8, wherein the information includes vehicle information and non-vehicle information.

13. The vehicle instrument panel of claim 8, wherein the display member, overlying the analogue indicator, comprises a scale aligned with the analogue indicator.

14. A method for displaying information on a vehicle instrument panel comprising:
displaying analogue information via an analogue indicator comprising a mechanical device, overlying a first substrate; and
displaying information via a display member overlying the analogue indicator, wherein the display member comprises a transparent portion which continuously remains transparent while a vehicle is in operation and a non-transparent portion which continuously remains non-transparent while the vehicle is in operation, the transparent portion aligned directly over the analogue indicator so that the analogue indicator is visible, and the non-transparent portion digitally display information which is not aligned directly over the analogue indicator.

15. The method of claim 14 further comprising displaying a scale on the display member, overlying the analogue indicator, so that the scale is aligned with the analogue indicator.

16. The method of claim 14, wherein the first substrate is an underlying display located underneath the analogue indicator, and further comprising display a scale on the underlying display.

17. the vehicle instrument panel of claim 1, wherein the information comprises vehicle information and non-vehicle information.

18. The vehicle instrument panel of claim 1, wherein the first substrate comprises a secondary display configured to digitally display additional information.

19. The vehicle instrument panel of claim 8, wherein the first substrate comprises a secondary display configured to digitally display additional information.

20. The method of claim 14, wherein the information comprises vehicle information and non-vehicle information.

21. The method of claim 14, wherein the first substrate comprises a secondary display, the second display digitally displaying additional information.

* * * * *